(12) United States Patent
Meyer et al.

(10) Patent No.: US 10,338,535 B2
(45) Date of Patent: Jul. 2, 2019

(54) METHOD FOR UNLOCKING A FUNCTION USING A TIMEPIECE

(71) Applicant: ETA SA Manufacture Horlogere Suisse, Grenchen (CH)

(72) Inventors: Vincent Meyer, Biel/Bienne (CH); David Benjamin Kraehenbuehl, Bettlach (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 26 days.

(21) Appl. No.: 15/664,558

(22) Filed: Jul. 31, 2017

(65) Prior Publication Data

US 2018/0039231 A1 Feb. 8, 2018

(30) Foreign Application Priority Data

Aug. 5, 2016 (EP) .................................... 16183072

(51) Int. Cl.
| | |
|---|---|
| *G04B 45/00* | (2006.01) |
| *G04C 17/00* | (2006.01) |
| *G04C 21/22* | (2006.01) |
| *G04G 9/00* | (2006.01) |
| *G04B 99/00* | (2006.01) |

(52) U.S. Cl.
CPC ..... *G04B 45/0061* (2013.01); *G04B 45/0007* (2013.01); *G04C 17/0091* (2013.01); *G04C 21/22* (2013.01); *G04G 9/0064* (2013.01); *G04B 99/00* (2013.01)

(58) Field of Classification Search
CPC ............ G04B 45/0061; G04B 45/0007; G04B 99/00; G04C 17/0091; G04C 21/22; G04G 9/0064; G04G 21/04

USPC .... 368/229, 10, 46, 47; 340/825.44, 825.69, 340/825.71, 825.72; 348/71 LP, 563,
(Continued)

(56) References Cited

U.S. PATENT DOCUMENTS 6,282,152 B1 * 8/2001 Kurple ................. G04G 9/0064
340/12.28
9,744,943 B1 * 8/2017 Hiatt ....................... B60R 25/04

FOREIGN PATENT DOCUMENTS

DE      85 28 633         3/1986
EP      1 491 974 A1     12/2004
(Continued)

OTHER PUBLICATIONS

European Search Report dated Jan. 23, 2017 in European Application 16183072.4, filed on Aug. 5, 2016 (with English Translation of Categories of cited documents).

*Primary Examiner* — Edwin A. Leon
(74) *Attorney, Agent, or Firm* — Oblon, McClelland, Maier & Neustadt, L.L.P.

(57) ABSTRACT

The present embodiments provide a method for unlocking a function of a device using a timepiece including a display device including display elements and a control device driving the display elements in a predefined animation sequence. The method including that the timepiece is placed in front of a detection device, the control device is actuated to drive the display elements in the predefined animation sequence, the predefined animation sequence is detected by the detection device, the detected animation sequence is compared to a reference animation sequence, and if the detected animation sequence is identical to the reference animation sequence, then the function is unlocked.

10 Claims, 2 Drawing Sheets

(58) Field of Classification Search
USPC ................ 348/734; 370/313; 455/4.1, 151.4, 455/151.2, 353, 352
See application file for complete search history.

(56) References Cited

FOREIGN PATENT DOCUMENTS

FR         2 682 206 A1     4/1993
GB        2 296 115        6/1996

\* cited by examiner

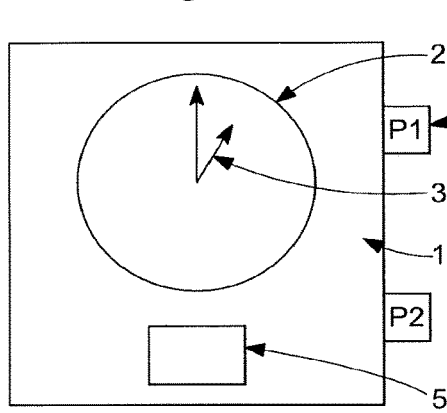
Fig. 1
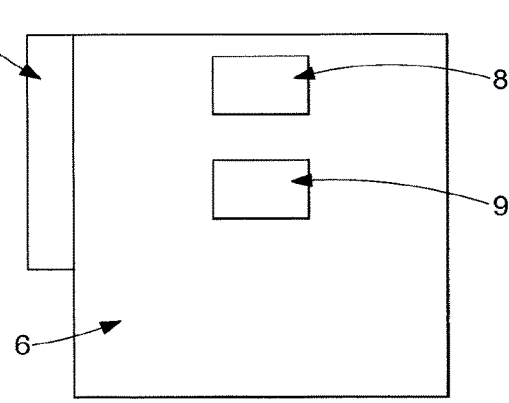
Fig. 2
Fig. 3
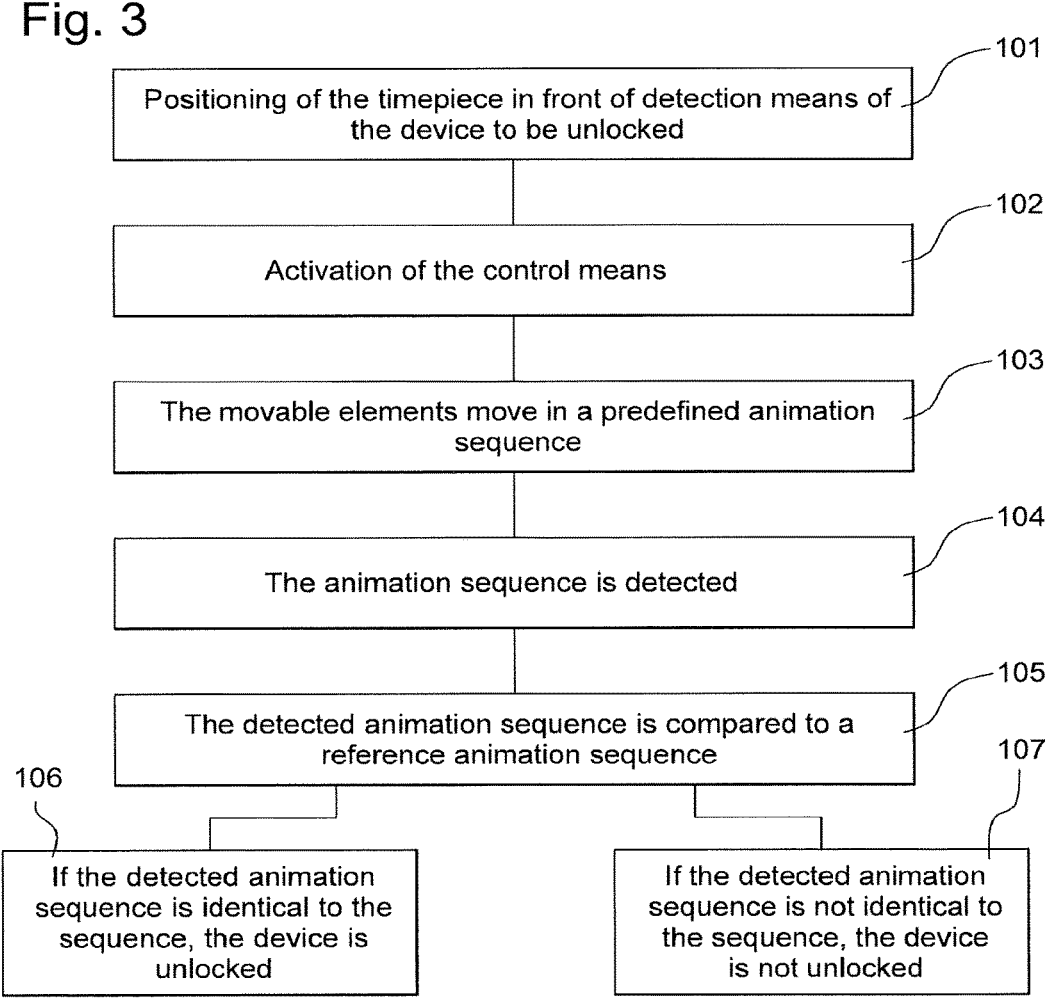

METHOD FOR UNLOCKING A FUNCTION USING A TIMEPIECE

This application claims priority from European patent application No. 16183072.4 filed Aug. 5, 2016, the entire disclosure of which is hereby incorporated herein by reference.

FIELD OF THE INVENTION

The present invention concerns a method for unlocking a function using a timepiece.

PRIOR ART

Most tablet, smartphone and computer type electronic devices have to be unlocked before being used. This is also the case for most applications stored in these devices.

Unlocking can be carried out by entering a password or a PIN, by a signature or by drawing an unlocking pattern with a finger on a touch screen.

However, the proliferation of devices or applications to be unlocked has led to a proliferation of passwords to be remembered. Further, the passwords entered or unlocking patterns drawn can be seen by third parties, and so they can be copied.

Therefore, other unlocking techniques have been developed, such as, for example, fingerprint recognition. However, this technique is not completely reliable either, since a fingerprint can be falsified.

SUMMARY OF THE INVENTION

It is an object of the invention to overcome the drawbacks of the prior art by proposing a technique for unlocking a device, notably an electronic device or an application, which is simpler and more reliable than the prior art techniques.

To achieve this, there is proposed, according to a first aspect of the invention, a method for unlocking a function of a device using a timepiece, the timepiece including:
  a display device including display elements;
  control means able to drive the display elements in a predefined animation sequence;
  the method including the following steps:
  the timepiece is placed facing detection means;
  the control means are actuated so that they drive the display elements in the predefined animation sequence;
  the predefined animation sequence is detected;
  the detected animation sequence is compared to a reference animation sequence;
  if the detected animation sequence is identical to the reference animation sequence, then the function is unlocked.

Thus, this method makes it possible to produce a predefined animation sequence using the timepiece display elements. This animation sequence is recognised by the device to be unlocked, which unlocks the device.

The method according to the first aspect of the invention may also exhibit one or more of the following features, taken individually or in all technically possible combinations.

Advantageously, the method includes a timepiece initialisation step during which the predefined animation sequence is stored in the timepiece, so that actuation of the control means drives the display elements in the predefined animation sequence. The user can thus choose the animation sequence that will be performed by the timepiece. However, this animation sequence may also first be defined when the timepiece is manufactured, to avoid all models having the same animation sequence.

Advantageously, the method also includes a device initialisation step during which the reference animation sequence is stored in the device. This step will allow the user to choose the animation sequence for unlocking the function.

According to different embodiments:
  the method further includes a step of actuating the control means in which at least one button of the timepiece is actuated, which allows the user to easily start the animation sequence;
  the method further includes a step of actuating the control means in which at least two buttons of the timepiece are actuated in a predetermined actuation sequence, which allows the unlocking method to be made secure, since the user must then know which actuation sequence to perform to start the animation sequence that will unlock the function.

It is possible to actuate the timepiece buttons by depressing, pulling, rotating them . . . .

Advantageously, for each of the display elements, the animation sequence includes a series of predefined positions for a predefined duration.

A second aspect of the invention concerns a timepiece for implementing an unlocking method according to the first aspect of the invention, the timepiece including:
  a display device including display elements;
  control means configured to drive the display elements in a predefined animation sequence.

The timepiece may also have one or more of the following features, taken individually or in all technically possible combinations.

According to various embodiments, the display elements may be:
  hands for indicating the time;
  counter hands;
  a screen;
  animation elements.

Advantageously, the timepiece further includes actuation means able to actuate the control means.

These actuation means may be:
  buttons;
  push buttons;
  crowns.

A third aspect of the invention concerns a device for implementing an unlocking method according to the first aspect of the invention, the device including:
  means for detecting an animation sequence;
  means for comparing a detected animation sequence to a reference animation sequence;
  unlocking means configured to unlock the function when the detected animation sequence is identical to the reference animation sequence.

The device is preferably an electronic device.
The function may be:
  an application stored in the device;
  starting the device;
  a data transmission.

The animation sequence detection means preferably include a camera.

The comparison means preferably include a processor.
The unlocking means preferably include a processor.

BRIEF DESCRIPTION OF THE DRAWINGS

Other features and advantages of the present invention will appear more clearly in the following detailed description of preferred embodiments, given by way of non-liming examples with reference to the appended Figures, in which:

FIG. 1 schematically represents a timepiece according to one embodiment of the invention;

FIG. 2 schematically represents a device to be unlocked according to one embodiment of the invention;

FIG. 3 schematically represents the steps of a method according to one embodiment of the invention;

DETAILED DESCRIPTION

Figure 4A:
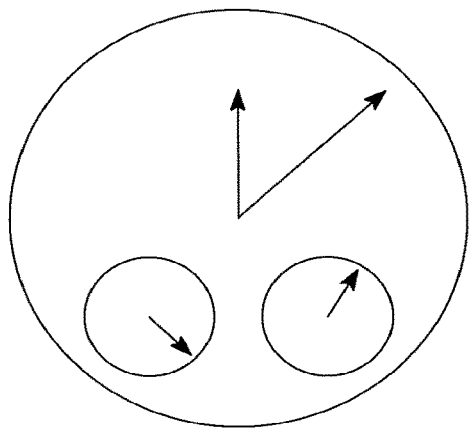
FIGS. 4a to 4d represent the successive positions that the display elements can take during an animation sequence used in the method of FIG. 3.
Figure 4B:
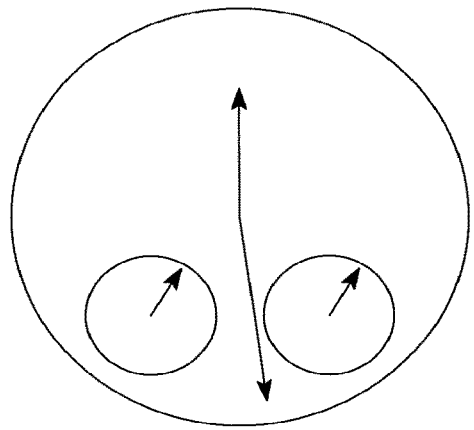
Figure 4C:
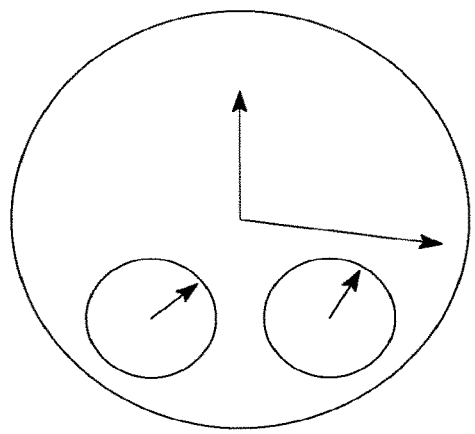
Figure 4D:
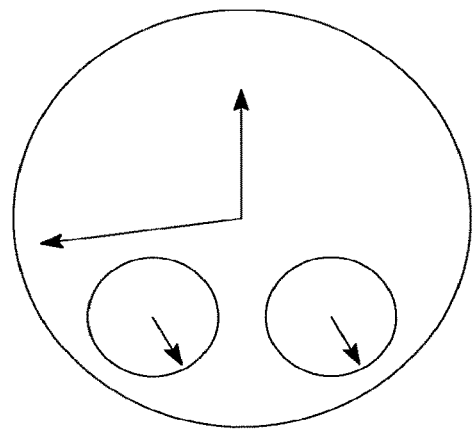

An unlocking method according to one embodiment of the invention will now be described with reference to FIGS. 1 to 4d.

This method uses a timepiece 1. This timepiece may be a watch. Timepiece 1 includes a display device 2. This display device may be a dial. Display device 2 includes display elements 3. These display elements 3 may be:
  time display hands;
  digital crystals;
  a screen;
  counter hands or crystals;
  decorative elements that can be animated . . . .

The timepiece also includes actuation means 4 which are actuatable by the user. These actuation means 4 may, for example, include buttons, push buttons, crowns . . . . Timepiece 1 also includes control means 5 configured to animate watch display elements 3 in a predefined animation sequence when they are actuated by actuation means 4.

Thus, by way of example, the timepiece of FIG. 1 includes as actuation means 4 two push buttons P1 and P2. When these two push buttons are pressed in a predefined actuation sequence, for example P1, P2, P2, P1, display elements 3 will be animated in a predefined animation sequence. This predefined animation sequence may, for example, be that represented in FIGS. 4a to 4d: in that case, the watch display elements will successively take the positions represented in FIGS. 4a to 4d, each position being maintained for a predetermined duration.

The predefined animation sequence is preferably factory set, so that each watch has its own animation sequence. However, the animation sequence could also be adjustable by the user, just like the actuation sequence which will allow the animation sequence to start.

This timepiece will be able to be used to unlock a function of a device 6, like that represented in FIG. 2.

The device may, for example be:
  an electronic device like a smartphone or a computer,
  a home automation device, for example of the sliding door or roller blind type,
  a safe . . . .

The method makes it possible, for example, to unlock the device start function, an application stored in the device, the opening or closing of the device, transmission of data to the device . . . .

To achieve this, device 6 includes means 7 for detecting an animation sequence. These detection means 7 preferably include a camera able to film an animation sequence. Device 6 also preferably includes a memory able to store the detected animation sequence. Device 6 also includes comparison means 8 able to compare the detected animation sequence to a reference animation sequence. These comparison means 8 preferably include a processor. Device 6 also includes function unlocking means 9, configured to unlock the function when the detected animation sequence is identical to the reference animation sequence. These unlocking means preferably include a processor.

The reference animation sequence is preferably stored by the user in the device, in an initialisation step. However, it may also be pre-stored in the device during manufacture.

The steps of the method will now be described with reference to FIG. 3.

The timepiece display device 2 is first placed in front of detection means 7 of device 6 in a step 101.

Actuation means 4 are then actuated in a predefined actuation sequence in a step 102. To achieve this, push buttons P1, P2 are pressed in a predetermined combination, for example P1 P2 P2 P1.

Control means 5 then start the predetermined animation sequence in a step 103.

Detection means 7 then detect the animation sequence carried out by the display elements in a step 104.

Comparison means 8 then compare the detected animation sequence to the reference animation sequence in a step 105.

If the detected animation sequence is identical to the reference animation sequence, then the method includes a step 106 of unlocking the function.

If the detected animation sequence is not identical to the reference animation sequence, then the function is not unlocked.

The method thus makes it possible to unlock a function of a device without the user having to remember a complex combination. Further, the method is secure, since even if a third party observes the combination on the watch push buttons or the animation sequence, he or she does not have the watch and therefore cannot copy the observed animation sequence.

Naturally, the invention is not limited to the embodiments described with reference to the Figures and variants could be envisaged without departing from the scope of the invention.

What is claimed is:

1. A method for unlocking a function of a device using a timepiece, the timepiece including a display device including a plurality of display elements and a control means for driving the plurality of display elements in a predefined animation sequence, the method comprising:
  placing the timepiece in front of a detection means;
  actuating the control means to drive the plurality of display elements in the predefined animation sequence;
  detecting the predefined animation sequence by the detection means;
  comparing the detected animation sequence to a reference animation sequence; and
  if the detected animation sequence is identical to the reference animation sequence, then unlocking the function.

2. The method according to claim 1, further comprising: initializing the timepiece during which the predefined animation sequence is stored in the timepiece so that actuation of the control means drives the plurality of display elements in the predefined animation sequence.

3. The method according to claim 1, further comprising: initializing the device during which the reference animation sequence is stored in the device.

4. The method according to claim 1, further comprising: actuating the control means in which at least one timepiece button is actuated.

5. The method according to claim 1, further comprising:
actuating the control means in which at least two timepiece buttons are actuated in a predetermined actuation sequence.

6. The method according to claim 1, wherein the animation sequence includes a series of predefined positions for a predefined duration for each of the plurality of display elements.

7. A timepiece for implementing an unlocking of a function, comprising:
a display device including a plurality of display elements;
a control means configured to drive the plurality of display elements in a predefined animation sequence; and
processing circuitry configured to:
receive an indication that the timepiece has been placed in front of a detection means,
instruct actuation of the control means to drive the plurality of display elements in the predefined animation sequence,
instruct comparison of the detected animation sequence to a reference animation sequence, and
if the detected animation sequence is identical to the reference animation sequence, then instruct unlock of the function.

8. The timepiece according to the preceding claim 7, further comprising:
actuation means able to actuate the control means.

9. The timepiece according to claim 7, further comprising:
means for detecting an animation sequence;
means for comparing the detected animation sequence to the reference animation sequence; and
unlocking means configured to unlock the function when the detected animation sequence is identical to the reference animation sequence.

10. The device according to the preceding claim 9, wherein the means for detecting the animation sequence includes a camera.

* * * * *